(12) United States Patent
Elton

(10) Patent No.: US 9,193,281 B2
(45) Date of Patent: Nov. 24, 2015

(54) RECLINING VEHICLE SEAT SYSTEM

(71) Applicant: Robert Elton, Ann Arbor, MI (US)

(72) Inventor: Robert Elton, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 63 days.

(21) Appl. No.: 14/255,455

(22) Filed: Apr. 17, 2014

(65) Prior Publication Data
US 2015/0298582 A1   Oct. 22, 2015

(51) Int. Cl.
*A47C 1/00*   (2006.01)
*B60N 2/22*   (2006.01)
*B60N 2/04*   (2006.01)

(52) U.S. Cl.
CPC ... *B60N 2/22* (2013.01); *B60N 2/04* (2013.01)

(58) Field of Classification Search
CPC .................................. B60N 2/22; B60N 2/20
USPC .............. 297/354.12, 354.1, 361.1, 327, 340; 296/65.09, 65.01, 65.16, 65.17, 65.13
See application file for complete search history.

(56) References Cited

U.S. PATENT DOCUMENTS

| | | | |
|---|---|---|---|
| 4,296,966 A * | 10/1981 | Terada ........................ 297/369 |
| 4,461,511 A * | 7/1984 | Berneking et al. ....... 297/354.12 |
| 4,662,673 A | 5/1987 | Crum |
| 4,714,227 A * | 12/1987 | Holm et al. .................. 248/595 |
| 5,527,087 A * | 6/1996 | Takeda et al. .................. 297/15 |
| 5,772,278 A | 6/1998 | Kowalski |
| 5,863,098 A * | 1/1999 | Kojima et al. ........... 297/344.15 |
| 6,540,295 B1 * | 4/2003 | Saberan et al. .......... 297/344.21 |
| 7,246,845 B2 * | 7/2007 | Rashidy et al. .......... 296/187.12 |
| 7,562,926 B2 * | 7/2009 | Kojima ...................... 296/65.13 |
| 7,780,230 B2 | 8/2010 | Serber |
| 7,850,220 B2 * | 12/2010 | Holdampf .................. 296/65.13 |
| 8,403,415 B2 | 3/2013 | Lawson |
| 8,662,561 B2 * | 3/2014 | Runde et al. ............... 296/65.09 |
| 2006/0214459 A1 * | 9/2006 | Kammerer et al. ........ 296/65.09 |
| 2009/0256379 A1 * | 10/2009 | Yamada et al. ............. 296/65.08 |
| 2010/0253110 A1 * | 10/2010 | Yamada et al. ............. 296/65.08 |
| 2011/0074199 A1 * | 3/2011 | Sprenger et al. ........... 297/361.1 |
| 2013/0175846 A1 | 7/2013 | Lawson |
| 2013/0214581 A1 | 8/2013 | Flucht et al. |

* cited by examiner

*Primary Examiner* — Laurie Cranmer
(74) *Attorney, Agent, or Firm* — Ralph E. Smith

(57) ABSTRACT

A vehicle seat system includes a vehicle floor, a floor bracket fixedly secured to the vehicle floor, an adjustable upper bracket, and a linkage assembly coupling the floor bracket to the adjustable upper bracket and including two front links and two rear links. The vehicle seat system also includes a seat back bracket coupled to the adjustable upper bracket and configured to travel between an upright position and a reclined position, and a seat bottom bracket coupled to the seat back bracket. As the seat back bracket travels between the upright and reclined positions, each of the two front links travel from one side of a vertical position, through the vertical position, and to the other side of the vertical position such that the vertical distance between the vehicle floor and the seat bottom bracket in the upright and reclined positions are substantially identical.

18 Claims, 5 Drawing Sheets

RECLINING VEHICLE SEAT SYSTEM

FIELD

The present disclosure relates generally to a reclining vehicle seat system and, more particularly, to an improved vehicle seat system that has cantilevered construction.

BACKGROUND

It is common for seats located in the front of the cabin of a vehicle to be configured to recline. Typically, such seats recline by allowing the seat back to pivot from its bottom near the bottom seat cushion and to extend in a rearward direction. In some vehicles, these types of reclining seats are unsuited for being utilized in the rear of the cabin due to the presence of a vehicle's trunk or truck bed into which the seat back cannot extend. Thus, while typical reclining vehicle seats work in most situations, there remains a need for improvement in the relevant art.

SUMMARY

In one form, a vehicle seat system is provided in accordance with the teachings of the present disclosure. In one example implementation, the vehicle seat system includes a vehicle floor, a floor bracket fixedly secured to the vehicle floor, and an adjustable upper bracket having a left side and a right side. The vehicle seat system further includes a linkage assembly coupling the floor bracket to the adjustable upper bracket. The linkage assembly includes two front links and two rear links, wherein one front link and one rear link are arranged on each of the left and right sides of the adjustable upper bracket. The vehicle seat system also includes a seat back bracket coupled to the adjustable upper bracket and configured to travel between an upright position and a reclined position, and a seat bottom bracket coupled to the seat back bracket. The seat bottom bracket defines a vertical distance between the vehicle floor and the seat bottom bracket. As the seat back bracket travels between the upright position and the reclined position, each of the two front links travel from one side of a vertical position, through the vertical position, and to the other side of the vertical position. Additionally, the vertical distance between the vehicle floor and the seat bottom bracket in the upright position is substantially identical to the vertical distance between the vehicle floor and the seat bottom bracket in the reclined position.

In some implementations, an angle defined between the seat bottom bracket and the seat back bracket changes by twelve degrees (12°) between the upright and reclined positions. Additionally or alternatively, each of the front links includes a bottom portion coupled with the floor bracket and a top portion coupled to the adjustable upper bracket, wherein the top portion travels sixty millimeters (60 mm) between the upright and reclined positions.

Furthermore, in another example implementation, the vehicle floor defines a floor plane and an angle defined between the floor plane and the front links changes from seventy to one-hundred and ten degrees (70-110°) as the seat back bracket travels from the upright position and the reclined position. Additionally or alternatively, the seat bottom bracket defines a seat bottom bracket length extending from a rear end portion to a front end portion, and the adjustable upper bracket extends no more than forty percent (40%) of the seat bottom bracket length from the rear end portion towards the front end portion such that the seat bottom bracket is cantilevered from the rear end portion.

In another form, a vehicle seat is provided in accordance with the teachings of the present disclosure. In one example implementation, the vehicle seat includes a floor bracket configured to be fixedly secured to a vehicle floor in an installed condition, an adjustable upper bracket having a left side and a right side, and a linkage assembly coupling the floor bracket to the adjustable upper bracket. The linkage assembly includes two front links and two rear links, wherein one front link and one rear link are arranged on each of the left and right sides of the adjustable upper bracket. The vehicle seat further includes a seat back bracket coupled to the adjustable upper bracket and configured to travel between an upright position and a reclined position, and a seat bottom bracket coupled to the seat back bracket. The seat bottom bracket defines a vertical distance between the vehicle floor and the seat bottom bracket in the installed condition. When in the installed condition and as the seat back bracket travels between the upright position and the reclined position, each of the two front links travel from one side of a vertical position, through the vertical position, and to the other side of the vertical position such that the vertical distance between the vehicle floor and the seat bottom bracket in the upright position is substantially identical to the vertical distance between the vehicle floor and the seat bottom bracket in the reclined position Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As mentioned above, a reclining vehicle seat of typical design is unsuited for some vehicle applications because the seat back is inhibited from being extended in the rearward direction. In some of these vehicles, the vehicle seat is capable of being reclined by sliding the bottom seat cushion portion of the seat forward to move the seat back from the rearward obstruction and permit it to extend in a rearward direction. This is performed by providing channels in the floor of the vehicle in which the bottom seat cushion travels.

Such channels require that the floor of the vehicle be of a relatively constant height. For some vehicles, however, it is beneficial to provide a stepped vehicle floor where the floor portion under the vehicle seat is offset from the floor portion into which a passengers legs typically extend. For such stepped floors, it is difficult if not impossible to provide a channel construction as described above. Thus, it would be desirable to provide a reclining vehicle seat system suitable for use with a vehicle floor that is stepped.

Figure 1:
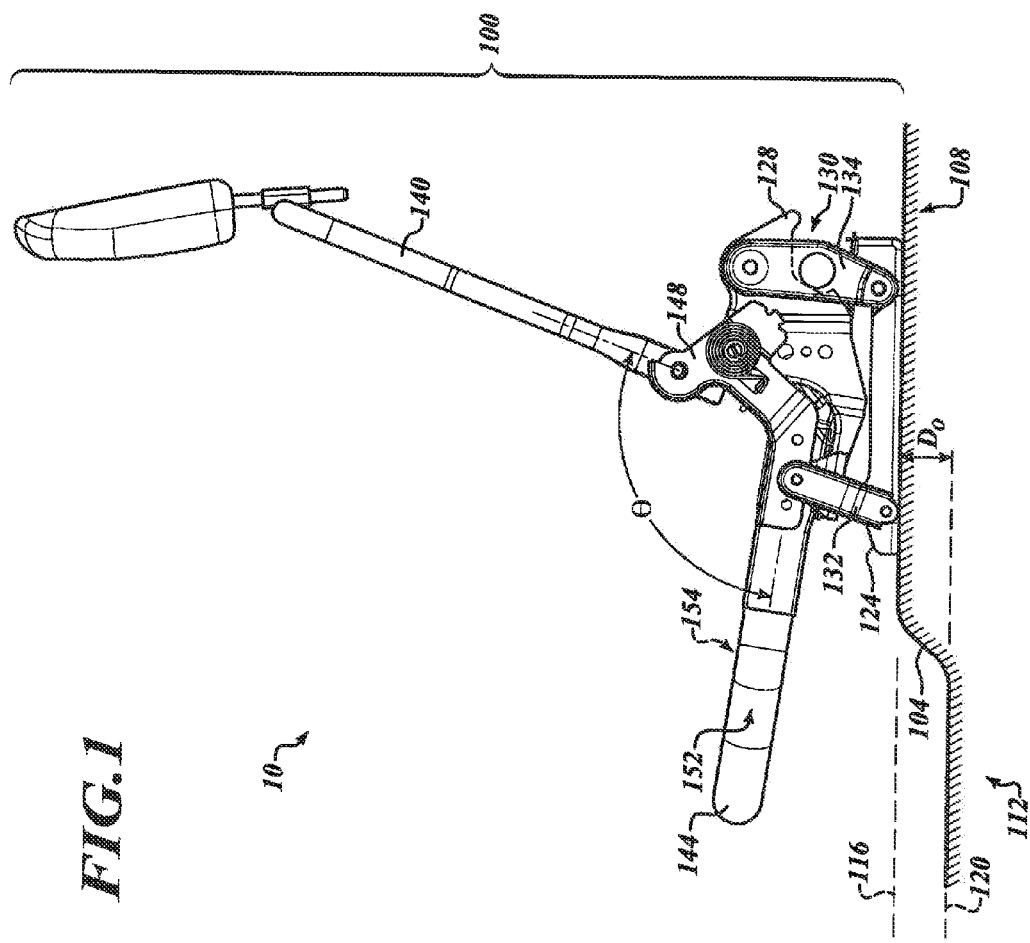
FIG. 1 is a side view of an example reclining vehicle seat system in an upright position according to the principles of the present disclosure.
Figure 2:
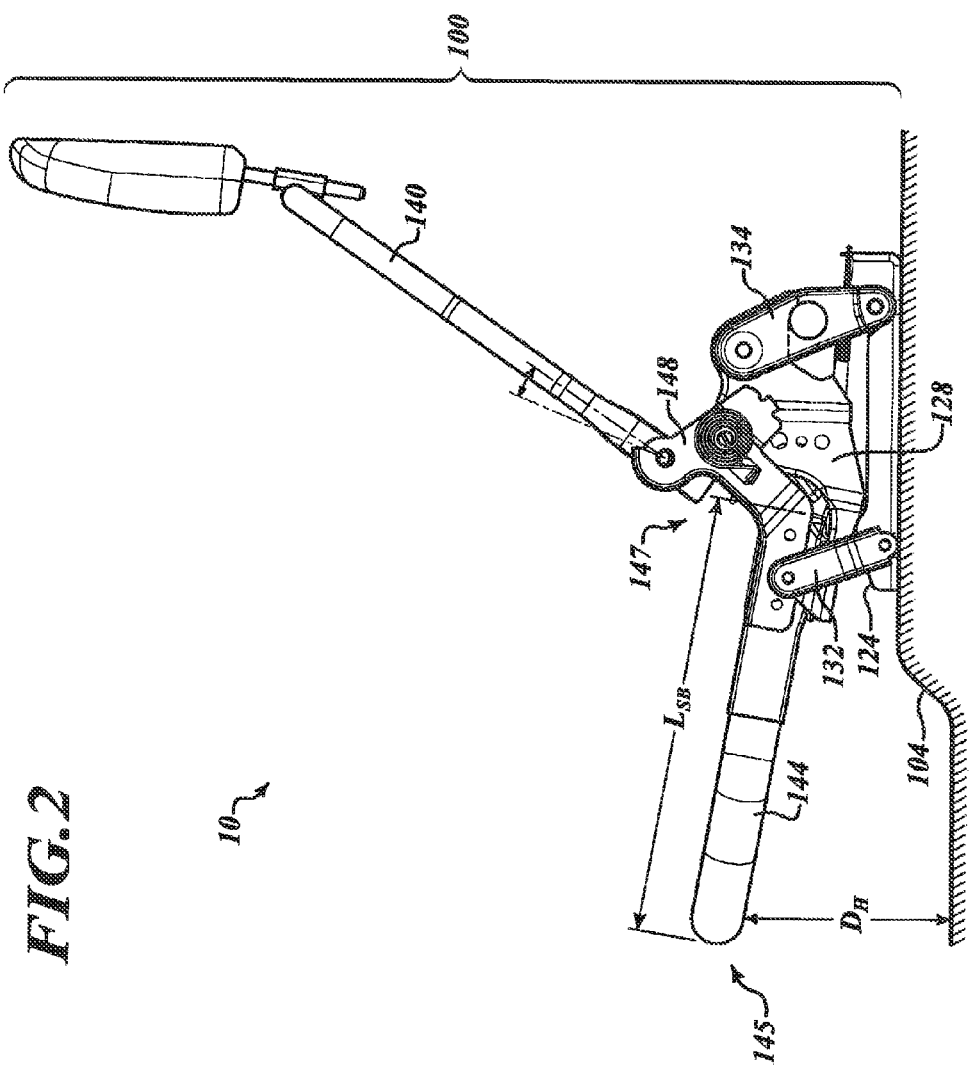
FIG. 2 is a side view of the example reclining vehicle seat system of FIG. 1 in a reclined position according to the principles of the present disclosure.

With initial reference to FIGS. 1-2, an example vehicle seat system 10 according to some embodiments of the present disclosure is illustrated. The vehicle seat system 10 includes a vehicle seat 100 that is fixedly secured to a vehicle floor 104. The vehicle floor 104 includes a seat portion 108 and a legroom portion 112. The seat portion 108 is the portion of the vehicle floor 104 to which the vehicle seat 100 is fixedly secured. The legroom portion 112 is the portion of the vehicle floor 104 where a passenger of the vehicle typically extends his/her legs. The vehicle seat 100 is configured to travel between an upright position (FIG. 1) and a reclined position (FIG. 2), as described more fully below.

In some embodiments, the vehicle floor 104 has a stepped configuration where the seat portion 108 is higher than (or lower than) the legroom portion 112. In the illustrated example, the seat portion 108 defines a seat portion plane 116 and the legroom portion defines a legroom portion plane 120 that is offset by an offset distance $D_o$ such that the seat portion 108 is higher than the legroom portion 112. It should be appreciated that the seat portion plane 116 and the legroom portion plane 120 need not be completely parallel to be offset from each other.

The vehicle seat 100 also includes a floor bracket 124 that is fixedly secured to the vehicle floor 104, an adjustable upper bracket 128 and a linkage assembly 130 that couples the floor bracket 124 to the adjustable upper bracket 128. The vehicle seat 100 further includes a seat back bracket 140 coupled to the adjustable upper bracket 128, and a seat bottom bracket 144 coupled to the seat back bracket 140. In one exemplary embodiment, the floor bracket 124 is fixedly secured to only the seat portion 108. In the illustrated example, the floor bracket 124 is secured to the seat portion 108 and contained within the seat portion 108.

In the illustrated example, the seat bottom bracket 144 is coupled to the seat back bracket 140 via the adjustable upper bracket 128 and a rotatable folding bracket 148. The folding bracket 148 is configured to rotate such that the seat bottom bracket 144 is capable of being positioned in either the deployed position to permit a passenger to sit (as shown), or a stowed position in which the seat bottom bracket 144 is arranged substantially vertically and adjacent to the seat back bracket 140 (not shown) to permit extra cargo to be stored in the cabin of the vehicle. It should be appreciated that other configurations of the vehicle seat 100, e.g., those that do not include a folding bracket 148 as described, are within the scope of this disclosure.

Figure 3:
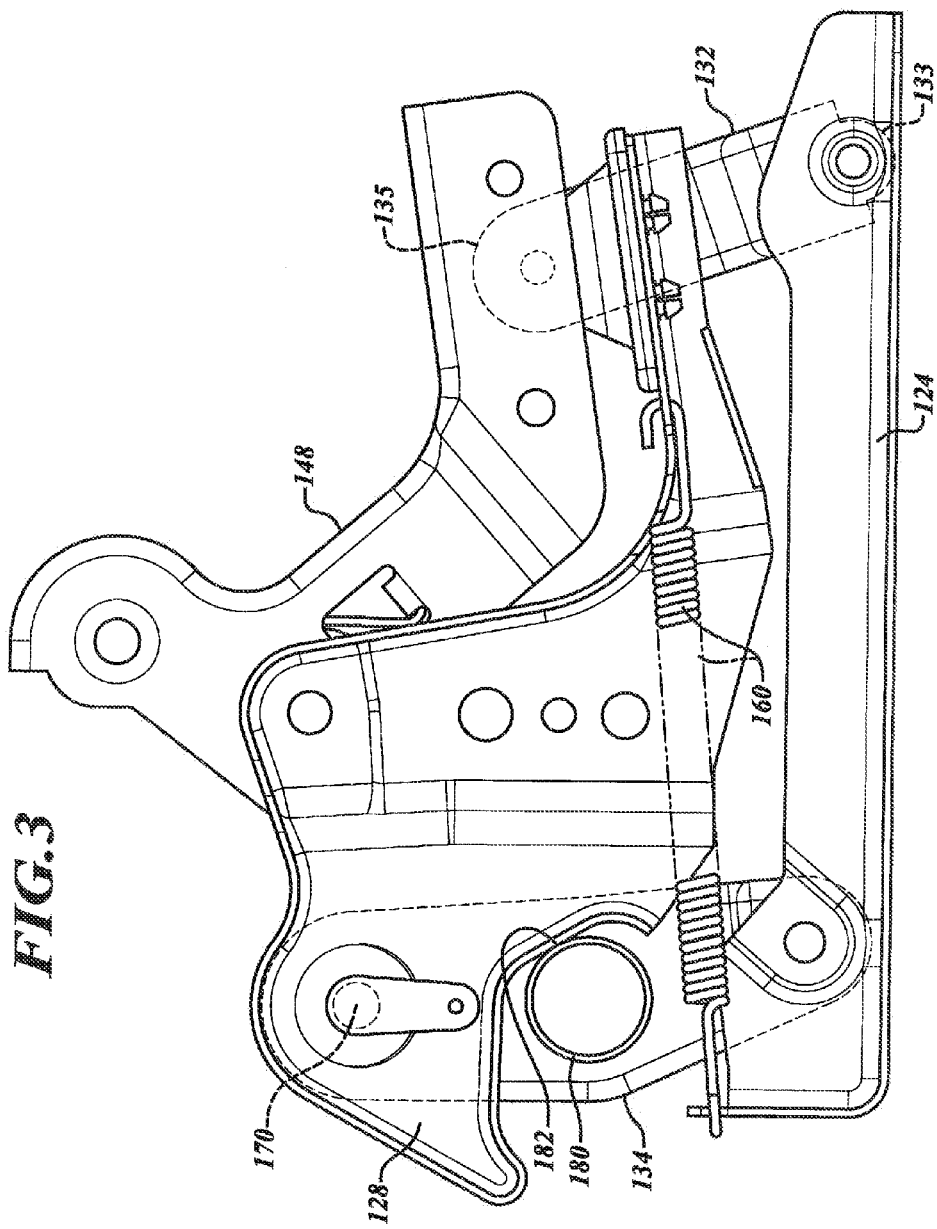
FIG. 3 is an internal side view of the example reclining vehicle seat system of FIG. 1 in the upright position according to the principles of the present disclosure.
Figure 4:
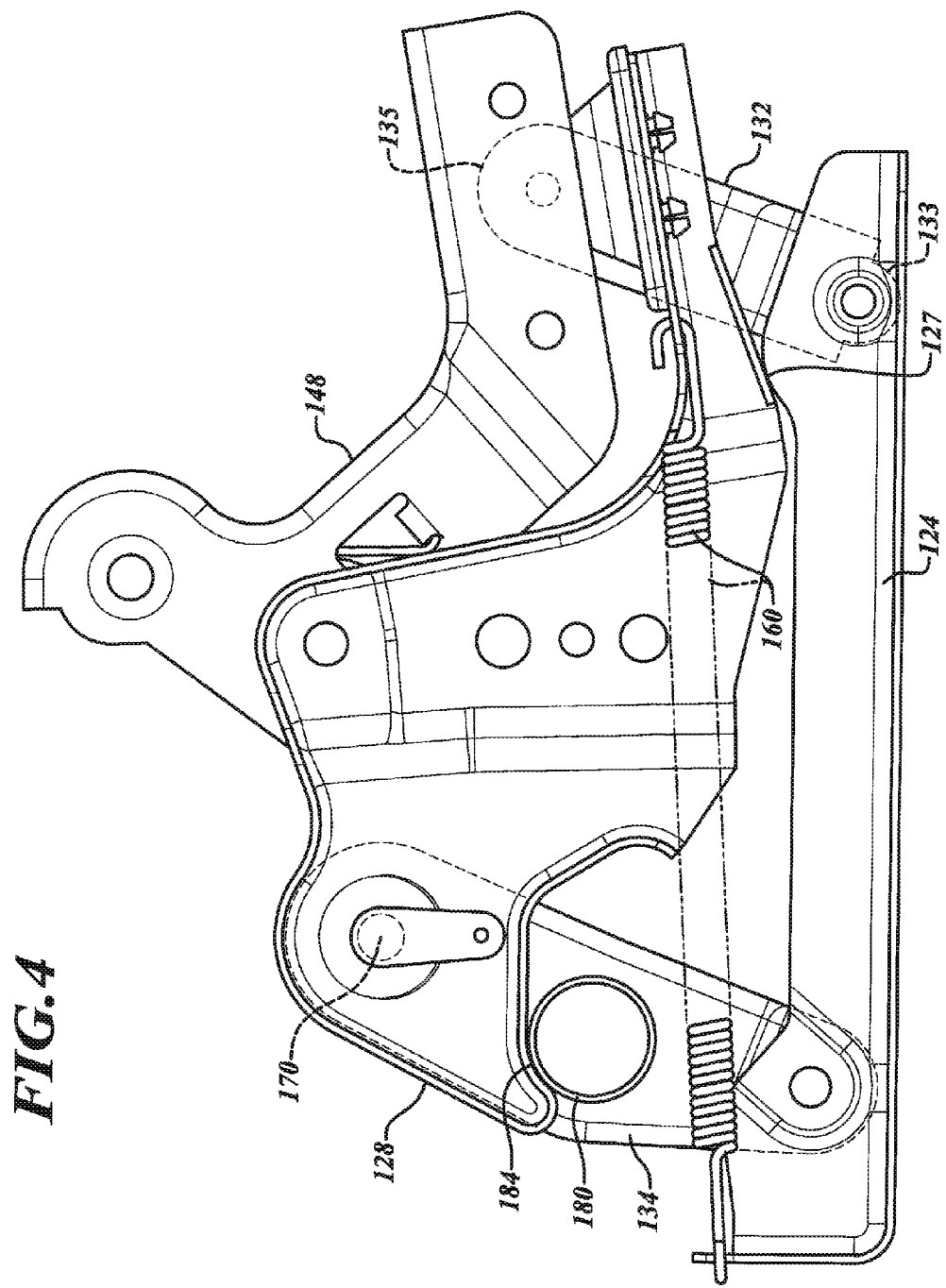
FIG. 4 is an internal side view of the example reclining vehicle seat system of FIG. 1 in the reclined position according to the principles of the present disclosure.

The adjustable upper bracket 128 has a left side 152 and a right side 154 opposite the left side 152. The linkage assembly 130 includes two front links 132 and two rear links 134, where one of the front links 132 and one of the rear links 134 are arranged on each of the left and right sides 152, 154. In this manner, the linkage assembly 130 supports the adjustable upper bracket 128 from the floor bracket 124 at four points. As shown in FIGS. 3-4, each of the front links 132 includes a bottom portion 133 coupled with the floor bracket 124 and a top portion 135 coupled to the adjustable upper bracket 128.

The seat bottom bracket 144 includes a front end portion 145 arranged over the legroom portion 112 of the vehicle floor 104 and a rear end portion 147 arranged over the seat portion 108 of the vehicle floor 104. The seat bottom bracket 144 further defines a seat bottom bracket length $L_{SB}$ extending from the front end portion 145 to the rear end portion 147. As will be described further below, the seat bottom bracket 144 is cantilevered from the rear end portion 147 such that the front links 132 of the linkage assembly 130 extend no more than approximately forty percent (40%) of the seat bottom bracket length $L_{SB}$ from the rear end portion 147.

In the deployed position, the seat bottom bracket 144 defines a vertical distance $D_H$ between the vehicle floor 104 and the seat bottom bracket 144. In the illustrated example, this vertical distance $D_H$ is defined between the legroom portion 112 of the vehicle floor 104 and the seat bottom bracket 144. As described more fully below, the vertical distance $D_H$ between the vehicle floor 104 and the seat bottom bracket 144 remains substantially the same throughout the movement of the vehicle seat 100 from the upright (FIG. 1) to the reclined position (FIG. 2).

With reference to FIGS. 3-4, the vehicle seat 100 further includes a biasing member 160 and a disc recliner 170. The biasing member 160 is coupled to the floor bracket 124 and the adjustable upper bracket 128. The biasing member 160 is configured to bias the seat back bracket 140 to the upright position shown in FIG. 1. In the illustrated example, the biasing member 160 is shown as a coil spring, but other types of biasing members are within the scope of the disclosure. It should be appreciated that, because FIGS. 3 and 4 are internal side views of the example reclining vehicle seat system of FIGS. 1 and 2, respectively, the position of the front and rear links 132, 134 in FIGS. 3 and 4 are shown opposite of their corresponding position in FIGS. 1 and 2. That is, because of the change in perspective, the left side of FIGS. 1 and 2 corresponds to the right side of FIGS. 3 and 4, and vice-versa.

The disc recliner 170 is coupled to the linkage assembly 130 and is configured to inhibit unintended motion of the adjustable upper bracket 128. In a locked condition, the disc recliner 170 inhibits motion of the adjustable upper bracket 128 and, in a released condition, permits motion of the adjustable upper bracket 128. To switch between the locked and released conditions, a passenger in the vehicle seat 100 interacts with the disc recliner 170, e.g., through a handle and cable mechanism (not shown).

The example vehicle seat 100 further includes a torque tube 180 coupled to and extending between the two rear links 134 of the linkage assembly 130. The torque tube 180 acts to inhibit independent movement of the two rear links 134 such that the left and right sides 152, 154 of the adjustable upper bracket 128 move in a coordinated fashion. In some embodiments, the torque tube 180 also provides a positive stop mechanism for the adjustable upper bracket 128 in the upright position and/or reclined position, as further described below.

As mentioned above, the seat back bracket 140 is configured to travel between the upright position (FIG. 1) and the reclined position (FIG. 2). An angle θ is defined between the seat back bracket 140 and the seat bottom bracket 144. The example vehicle seat 100 is configured such that the angle θ changes by approximately twelve degrees (12°) between the upright and reclined positions (see FIG. 2).

Figure 5:
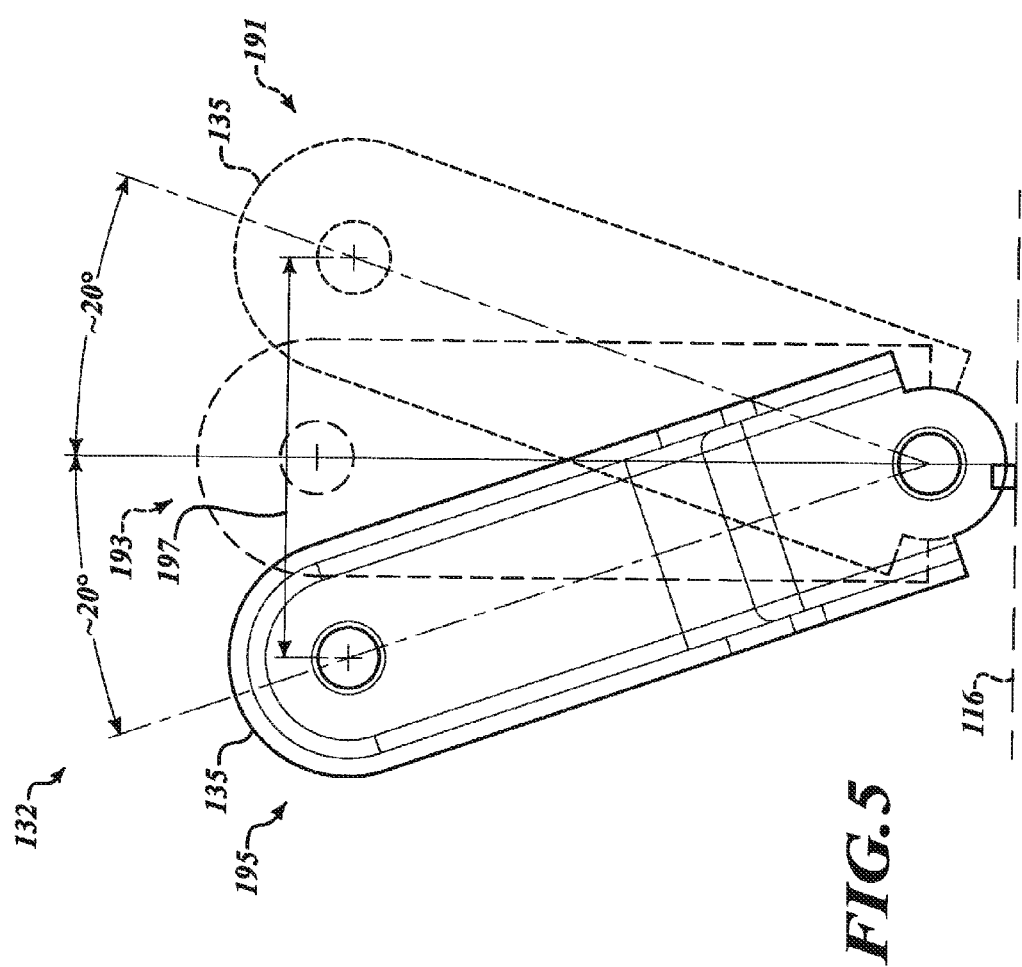
FIG. 5 is a schematic view illustrating various positions of a front link of a linkage assembly of the example reclining vehicle seat system of FIG. 1 according to the principles of the present disclosure.

With further reference to FIG. 5, as the seat back bracket 140 travels between the upright and reclined positions, each of the two front links 132 travel from one side 191 of a vertical position 193, through the vertical position 193, and to the other side 195 of the vertical position 193. In some embodiments, the angle defined between a floor plane (such as seat portion plane 116) and the front links 132 changes from approximately seventy to one-hundred and ten degrees (70-

110°) as the seat back bracket 140 travels from the upright to the reclined position. This results in a change in the angle of the front links 132 of approximately forty degrees (40°) between the upright to the reclined positions. Furthermore, in some embodiments, the top portions 135 of the front links 132 travel a travel distance 197 of approximately sixty millimeters (60 mm) between the upright and reclined positions.

In some embodiments, the angle with respect to the vertical position 193 defined by the front links 132 in the upright position on the one side 191 and the angle with respect to the vertical position 193 defined between the front links 132 in the reclined position on the other side 195 are substantially similar (+/− five degrees). As a result of this and the two front links 132 traveling from the one side 191 to the other side 195 through the vertical position 193, the vertical distance $D_H$ between the vehicle floor 104 and the seat bottom bracket 144 remains substantially constant between the upright and reclined positions.

Furthermore, in this configuration the vertical distance $D_H$ between the vehicle floor 104 and the seat bottom bracket 144 in the upright position is substantially identical to the vertical distance $D_H$ between the vehicle floor 104 and the seat bottom bracket 144 in the reclined position. For example only, the vertical distance $D_H$ between the vehicle floor 104 and the seat bottom bracket 144 in the upright position is within ten percent (10%) of the vertical distance $D_H$ in the reclined position. In this manner, a passenger sitting in the vehicle seat 100 is unlikely to perceive any change in the vertical distance $D_H$ between the vehicle floor 104 and the seat bottom bracket 144 when switching between the upright and reclined positions, and vice-versa.

With particular reference to FIGS. 3-4, in some embodiments the torque tube 180 provides a positive stop mechanism for the adjustable upper bracket 128 in the upright (FIG. 3) and reclined positions (FIG. 4). For example only, in the upright position (FIG. 3) the torque tube 180 contacts a front contact surface 182 of the adjustable upper bracket 128. Similarly, in the reclined position (FIG. 4) the torque tube 180 contacts a rear contact surface 184 of the adjustable upper bracket 128. In various further embodiments, the floor bracket 124 provides a positive stop mechanism for the adjustable upper bracket 128 in the reclined position (FIG. 4). For example only, the floor bracket 124 defines a top contact surface 127 that contacts the adjustable upper bracket 128 in the reclined position to provide the positive stop functionality. Through the use of the described positive stop mechanisms, the vehicle seat 100 is inhibited from traveling beyond the intended upright and reclined positions.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle seat system, comprising:
    a vehicle floor;
    a floor bracket fixedly secured to the vehicle floor;
    an adjustable upper bracket having a left side and a right side;
    a linkage assembly coupling the floor bracket to the adjustable upper bracket, the linkage assembly including two front links and two rear links, wherein one front link and one rear link are arranged on each of the left and right sides of the adjustable upper bracket;
    a seat back bracket coupled to the adjustable upper bracket and configured to travel between an upright position and a reclined position; and
    a seat bottom bracket coupled to the seat back bracket, the seat bottom bracket defining a vertical distance between the vehicle floor and the seat bottom bracket,
    wherein, as the seat back bracket travels between the upright position and the reclined position, each of the two front links travel from one side of a vertical position, through the vertical position, and to the other side of the vertical position, and
    wherein the vertical distance between the vehicle floor and the seat bottom bracket in the upright position is substantially identical to the vertical distance between the vehicle floor and the seat bottom bracket in the reclined position.

2. The vehicle seat system of claim 1, wherein an angle defined between the seat bottom bracket and the seat back bracket changes by twelve degrees (12°) between the upright and reclined positions.

3. The vehicle seat system of claim 1, wherein each of the front links includes a bottom portion coupled with the floor bracket and a top portion coupled to the adjustable upper bracket, the top portion travelling sixty millimeters (60 mm) between the upright and reclined positions.

4. The vehicle seat system of claim 1, wherein the vehicle floor defines a floor plane and an angle defined between the floor plane and the front links changes from seventy to one-hundred and ten degrees (70-110°) as the seat back bracket travels from the upright position and the reclined position.

5. The vehicle seat system of claim 1, wherein the vehicle floor includes a seat portion and a legroom portion, the floor bracket being fixedly secured to only the seat portion, the seat portion defining a seat portion plane and the legroom portion defining a legroom portion plane that is offset from the seat portion plane.

6. The vehicle seat system of claim 5, wherein the vertical distance is defined between the legroom portion of the vehicle floor and the seat bottom bracket.

7. The vehicle seat system of claim 6, wherein the seat bottom bracket includes a front end portion and a rear end portion, the front end portion arranged over the legroom portion of the vehicle floor and the rear end portion arranged over the seat portion of the vehicle floor.

8. The vehicle seat system of claim 1, wherein:
    the seat bottom bracket defines a seat bottom bracket length extending from a rear end portion to a front end portion; and
    the adjustable upper bracket extends no more than forty percent (40%) of the seat bottom bracket length from the rear end portion towards the front end portion such that the seat bottom bracket is cantilevered from the rear end portion.

9. The vehicle seat system of claim 1, further comprising a biasing member coupled to the floor bracket and the adjustable upper bracket, the biasing member configured to bias the seat back bracket to the upright position.

10. The vehicle seat system of claim 9, further comprising a disc recliner coupled to the linkage assembly and configured to inhibit motion of the adjustable upper bracket in a locked condition and permit motion of the adjustable upper bracket in a released condition.

11. The vehicle seat system of claim 1, further comprising a torque tube coupled to and extending between the two rear links.

12. The vehicle seat system of claim 11, wherein the torque tube provides a positive stop mechanism for the adjustable upper bracket in the upright position and the reclined position.

13. The vehicle seat system of claim 12, wherein the floor bracket defines a contact surface, the contact surface providing a positive stop mechanism for the adjustable upper bracket in the reclined position.

14. A vehicle seat, comprising:
   a floor bracket configured to be fixedly secured to a vehicle floor in an installed condition;
   an adjustable upper bracket having a left side and a right side;
   a linkage assembly coupling the floor bracket to the adjustable upper bracket, the linkage assembly including two front links and two rear links, wherein one front link and one rear link are arranged on each of the left and right sides of the adjustable upper bracket;
   a seat back bracket coupled to the adjustable upper bracket and configured to travel between an upright position and a reclined position; and
   a seat bottom bracket coupled to the seat back bracket, the seat bottom bracket defining a vertical distance between the vehicle floor and the seat bottom bracket in the installed condition,
   wherein, when in the installed condition and as the seat back bracket travels between the upright position and the reclined position, each of the two front links travel from one side of a vertical position, through the vertical position, and to the other side of the vertical position such that the vertical distance between the vehicle floor and the seat bottom bracket in the upright position is substantially identical to the vertical distance between the vehicle floor and the seat bottom bracket in the reclined position.

15. The vehicle seat of claim 14, wherein an angle defined between the seat bottom bracket and the seat back bracket changes by twelve degrees (12°) between the upright and reclined positions.

16. The vehicle seat of claim 14, wherein each of the front links includes a bottom portion coupled with the floor bracket and a top portion coupled to the adjustable upper bracket, the top portion travelling sixty millimeters (60 mm) between the upright and reclined positions.

17. The vehicle seat of claim 14, wherein the floor bracket defines a floor bracket plane and an angle defined between the floor bracket plane and the front links changes from seventy to one-hundred and ten degrees (70-110°) as the seat back bracket travels from the upright position and the reclined position.

18. The vehicle seat of claim 14, wherein:
   the seat bottom bracket defines a seat bottom bracket length extending from a rear end portion to a front end portion; and
   the adjustable upper bracket extends no more than forty percent (40%) of the seat bottom bracket length from the rear end portion towards the front end portion such that the seat bottom bracket is cantilevered from the rear end portion.

* * * * *